United States Patent [19]

Zenobi

[11] Patent Number: 4,667,902
[45] Date of Patent: May 26, 1987

[54] PASSIVE ARM RETENTION CURTAIN

[75] Inventor: Thomas J. Zenobi, Perkasie, Pa.

[73] Assignee: The United States of America as represented by the Secretary of the Navy, Washington, D.C.

[21] Appl. No.: 667,685

[22] Filed: Nov. 2, 1984

[51] Int. Cl.⁴ .............................................. B64D 25/10
[52] U.S. Cl. ......................... 244/122 A; 244/122 AG; 244/122 AH
[58] Field of Search ................. 244/122 AG, 122 AE, 244/122 A, 122 AH, 121, 141

[56] References Cited
U.S. PATENT DOCUMENTS
3,214,117  10/1965  James et al. .................... 244/122 A FOREIGN PATENT DOCUMENTS
1570283  6/1980  United Kingdom ........ 244/122 AG Primary Examiner—Joseph F. Peters, Jr.
Assistant Examiner—Lynn M. Fiorito
Attorney, Agent, or Firm—Robert F. Beers; Henry Hansen

[57] ABSTRACT

A pilot arm retention system for an aircraft ejection seat which includes inertia reels and a parachute is comprised of a pair of nets connected between respective sides of the seat and a pair of deployment straps which are releasably coupled to the inertia reel straps and parachute risers and routed down over the front of the seat through a pair of snubbers to fixed points on the cockpit floor.

4 Claims, 5 Drawing Figures

PASSIVE ARM RETENTION CURTAIN

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates generally to aircraft ejection seats, and more particularly to means for positioning and restraining the arms of a crewmember in such seats during ejection.

Upon ejection from an aircraft, a crewmember is subjected to an extremely high relative windstream which may cause his limbs to flail, resulting in severe injuries. For example, of the ejection related injuries reported during the Vietnam conflict, 64% were due to a flailing of the crewmember's arms (see "Prototype Development Passive, Seat-Mounted, Limb Retention System", Naval Air Development Center Report No. NADC-79201-60, May 1979 Accession No. AD-A076 331). Such injuries hamper the crewmember's attempts to control his parachute and to release it after descent onto land or espcecially into water.

In order to reduce these flail injuries, various devices have been proposed which utilize any of numerous combinations of straps, nets or bladders to position and restrain the arms of a crewmember in an aircraft ejection seat during ejection. However, such prior art devices have not been fully satisfactory for a variety of reasons. For example, many such devices have been "active" in that they impose additional tasks on the crewmember in order for them to be readied. These devices may be improperly attached or ignored entirely by the crewmember, rendering them ineffective or causing injury to the crewmember during their deployment. Other devices, such as U.S. Pat. No. 4,359,200 to Brevard et al or U.S. Pat. No. 4,215,835 to Wedgwood, require a separate system to deploy their restraining means, making them more complex.

SUMMARY OF THE INVENTION

Accordingly, it is a general purpose and object of the present invention to provide a retention system for aircraft ejection seats that minimizes flail injuries to a crewmember's arms during ejection.

Another object of the present invention is to provide such a systme that deploys quickly and reliably and will not injure the ejecting crewmember.

A further object of the present invention is to provide such a system which is passive so that the crewmember need not hook up to additional equipment nor wear additional devices.

Still a further object of the present invention is to provide such a system which requires no separate deployment means.

Yet another object of the present invention is to provide such a system which, when not deployed, will not interfere with the crewmember's movements during normal flight operations.

Briefly, these and other objects of the present invention are accomplished by a passive arm retention curtain adapted for use by a crewmember wearing a torso harness in an aircraft ejection seat having inertia reel straps. A pair of substantially rectangular nets, reinforced at their top and bottom by webbed straps, are each attached along one side thereof to respective sides of the seat back. Attached along the other side of each net, a deployment strap having a slip ring attached to one of its ends is slidingly coupled to respective inertia reel straps, releaseably coupled to a parachute riser/torso harness connector fitting by a breakaway strap, and routed down through a seat cushion cover passageway and a snubber mechanism at the lower front edge of the seat to a cockpit floor attachment. Each net further has contiguously attached to its surface at predetermined intervals elastic bands to gather it up.

When the crewmember enters the cockpit and attaches his torso harness to the parachute riser and inertia reel shoulder straps, the curtain is readied. During normal flight operations, the curtain remains slightly draped on the sides of the crewmember's shoulders with overall torso mobility provided by the elastic bands and slip rings. In the event of an emergency requiring ejection from the aircraft, ejection seat movement up the seat guide rails pulls the deployment webbing through the seat cushion cover passageways and snubber mechanisms, deploying the nets forward around the crewmembers'arms. Upon seat/man separation, the inertia reel straps are released from their respecitve inertia reel and the parachute begins to pull the crewmember from the seat, thus parting the breakaway and inertia reel straps and allowing the curtain to fall free of the crewmember.

Other objects, advantages and novel features of the invention will become apparent from the following detailed description of the preferred embodiment when considered in conjunction with the accompanying drawings wherein:

DETAILED DESCRIPTION OF THE PREFERRED EMBODIMENT

Figure 1:
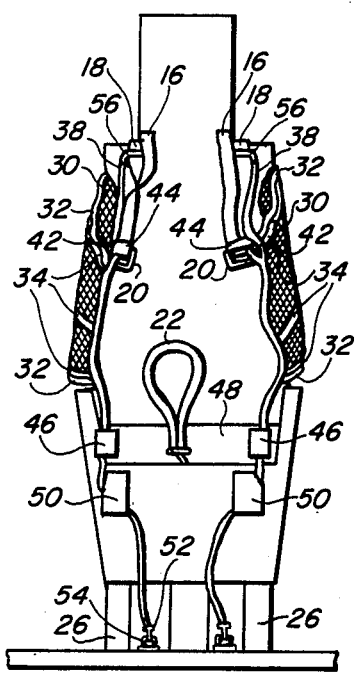
FIG. 1 is a front view of an aircraft ejection seat with a passive arm retention curtain according to the present invention.

Referring now to the drawings, wherein like characters designate like or corresponding parts throughout the several views, there is shown in FIG. 1 a conventional aircraft ejection seat 10 having installed thereon a passive arm retention curtain 12 in accordance with the present invention.

Figure 2:
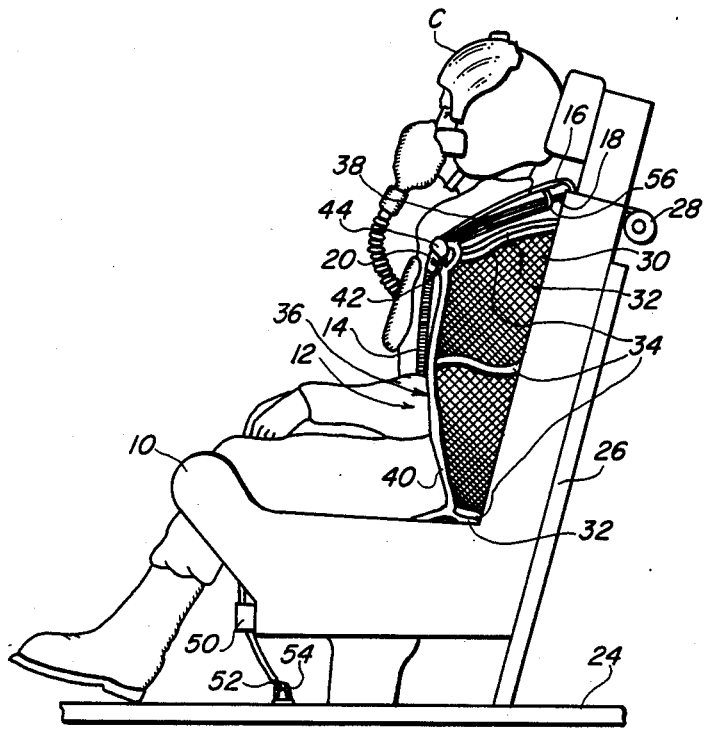
FIG. 2 is a side view of the curtain of FIG. 1 as worn by a crewmember during normal flight.

As seen in conjunction with FIG. 2, a crewmember C is retained conventionally in the seat 10 by means of a torso harness 14 connected to his parachute risers 16 and a pair of inertia reel straps 18 by a fitting 20. In a conventional manner, upon initiation of the ejection sequence of the crewmember C pulling on a handle 22, the seat 10 will move out and away from the aircraft frame 24 as guided by a pair of rails 26. Simultaneously, a pair of conventional inertia reels 28 will tighten the inertia reel straps 18 and therefore pull the crewmember C back against the seat 10.

In order to position and restrain the arms of the crewmember C during ejection, the curtain 12 includes a pair of substantially rectangular nets 30 attached along one side to the respective sides of the seat 10, reinforced at their tops and bottoms by a pair of contiguously attached, webbed straps 32, and gathered up by a plurality of elastic bands 34 which are contiguously attached to the nets 30 at predetermined intervals in order to prevent the curtain 12 from interfering with normal arm movement. A deployment strap 36, comprised of an upper portion 38 and a lower portion 40, is attached to the other side of each net 30 such that the intersection of the upper and lower portions 38 and 40 form a loop 42 through which is connected a breakaway strap 44, further connected to the parachute riser 16 at a point adjacent to the fitting 20.

Figure 3:
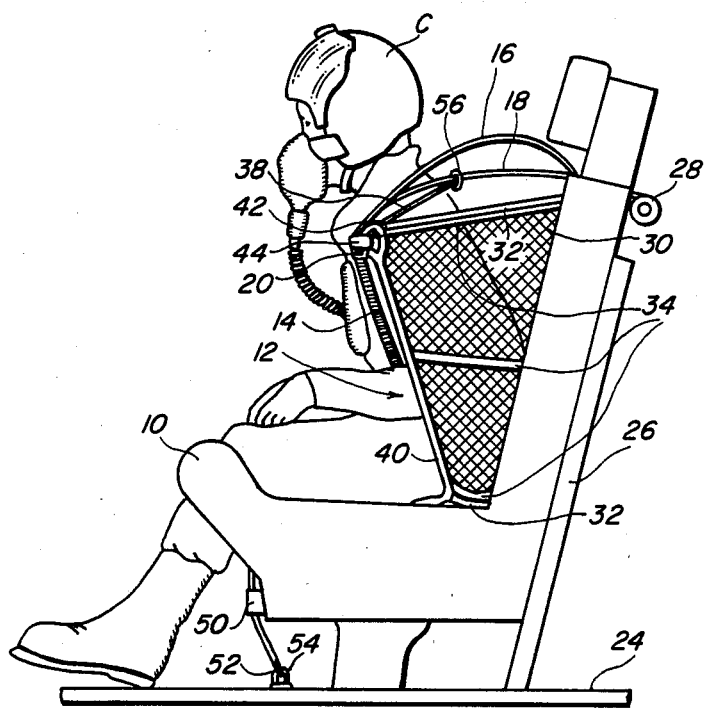
FIG. 3 illustrates the curtain with the crewmember leaning forward during normal flight.

The distal end of the lower portion 40 is routed down the seat 10 through a detachable passageway 46 on the front of a seat pan cushion 48. Thereafter, the lower portion 40 is routed through a rachet assembly or one-way snubber 50 attached to the lower front portion of the seat 10 and thence, by means of a link 52 attached to the bitter end of the lower portion 40, is attached to a cockpit floor attachment 54. Attached to the distal end of the upper portion 38 is a slip ring 56 which is further slidingly coupled to the inertia reel strap 18 in order to permit upper body movement by the crewmember C while maintaining the curtain 12 in a semi-deployed, ready position about the shoulders of the crewmember C as shown in FIG. 3.

Figure 4:
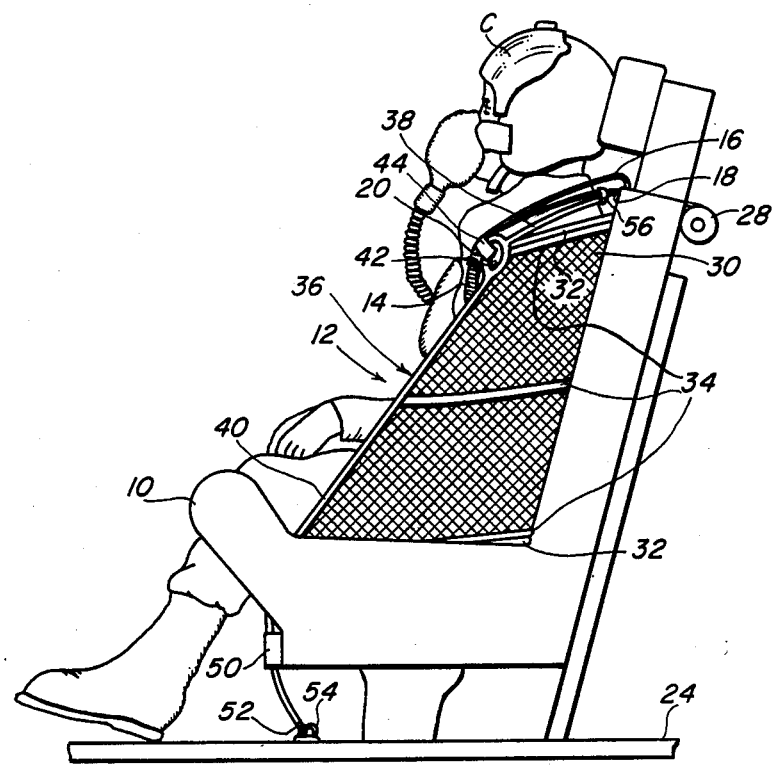
FIG. 4 illustrates the deployment of the PARC upon ejection sequence initiation.
Figure 5:
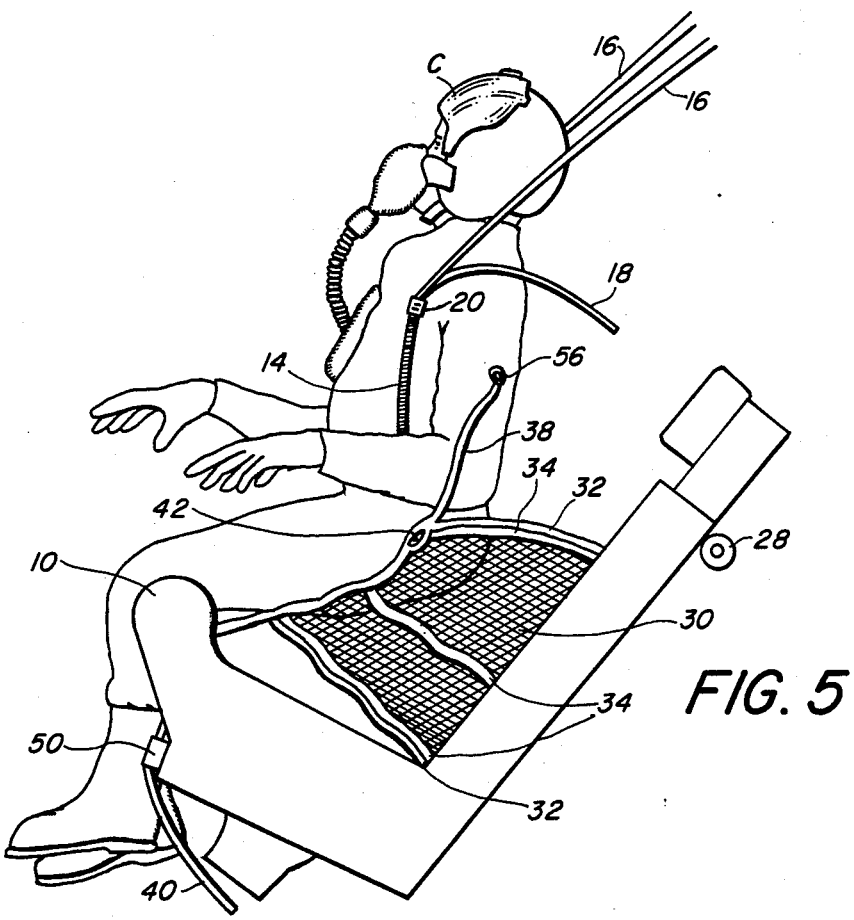
FIG. 5 illustrates the curtain upon seat/man separation.

Having described in some detail the structural features of the invention, the operation and use of the curtain 12 will now be summarized with reference to FIGS. 4 and 5. The curtain 12 is readied when the crewmember C enters the seat 10 and connects his torso harness 14 to fitting 20. In the event of an emergency requiring ejection from the aircraft, the crewmember C initiates the ejection sequence by pulling the handle 22. As the inertia reels 28 tighten the inertia reel straps 18 and the seat 10 moves out and away from the aircraft frame 24, the deployment straps 36 are pulled taut carrying with them the nets 30 which envelope the arms of the crewmember C. When the links 52 attached to the end of the lower portions 40 break away from the cockpit floor attachments 54, the one-way snubbers 50 hold the deployment straps 36 in their deployed position until seat/man separation occurs.

At the appropriate time for seat/man separation, the inertia reel straps 18 are disengaged from the inertia reels 28 by such conventional means as guillotines or pneumatic release mechanisms (not shown) thus permitting the upper portions 38 to slide free. When the parachute (not shown) begins to pull the crewmember C out of the seat 10 as shown in FIG. 5, the breakaway straps 44 and detachable passageways 46 part allowing the curtain 12 to fall away from the crewmember C.

Some of the many advantages of the invention should now be readily apparent. For example, a novel system has been provided which is capable of positioning and restraining during ejection the arms of a crewmember in an aircraft ejection seat. The system is readied when the crewmember enters the seat and connects his torso harness to conventional inertia reels and his parachute, thus requiring no further steps by the crewmember. Furthermore, the system permits freedom of movement by the crewmember during normal flight operations and falls freely away from the crewmember during seat/man separation.

Obviously many modifications and variations of the present invention are possible in light of the above teachings. It is therefore to be understood that within the scope of the appended claims, the invention may be practiced otherwise than as specifically described.

What is claimed is:

1. An arm retention system for an aircrewman during ejection from an aircraft, comprising in combination:
   a torso harness for the crewman;
   an ejection seat mounted in the frame of the aircraft;
   parachute risers connected to said harness for deployment of a parachute after ejection;
   quadrilateral nets, each connected along one side thereof to respective sides of the back of the seat, formed to extend around the arms of the crewman;
   lower portion deployment straps, each releasably connected at one end thereof to said harness and to one of said risers and at the other end thereof to the frame, and each contiguously attached along the length thereof to respective opposite sides of said nets;
   inertia reel means mounted on the back of said seat, including reel straps rigidly attached to said harness for pulling the crewman back against the seat and said nets taut around the arms upon initiating ejection, said reel straps being severable from said harnes and said ends upon initiating separation of said seat and the crewman; and
   breakaway means directly connected to said risers and said one ends of said lower portion deployment straps for disconnecting them from each other only when said risers are tensioned by the parachute deployment.

2. A system according to claim 1 wherein each of said nets further comprises:
   a flexible panel;
   reinforcement straps attached along their lengths to either end of said panel; and
   elastic means operatively connected to either end of said panel for gathering up said panel.

3. A system according to claim 1, further comprising:
   upper portion deployment straps rigidly connected at one end thereof to each of said one ends of said lower portion deployment straps; and
   slip rings attached to the other ends of said upper portion deployment straps and slidingly coupled to said inertia reel means for permitting upper body movement prior to initiating an ejection sequence.

4. A system according to claim 1 further comprising:
   snubber means formed to be connected to the front of said seat for receiving and holding said lower portion deployment straps taut after operation of said reel means; and
   disconnect means operatively connected to said other ends of said lower portion deployment straps and the frame for disengaging said lower portion deployment straps and the frame as said seat separates from the aircraft during ejection.

* * * * *